United States Patent
Qureshi

(10) Patent No.: US 6,593,858 B2
(45) Date of Patent: Jul. 15, 2003

(54) METHODS AND APPARATUS FOR GENERATING A VERTICAL SITUATIONAL IMAGE OF A VEHICLE

(75) Inventor: Hisham M. Qureshi, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/954,918

(22) Filed: Sep. 12, 2001

(65) Prior Publication Data

US 2003/0048204 A1 Mar. 13, 2003

(51) Int. Cl.[7] ............................................. G01C 21/00
(52) U.S. Cl. ...................... 340/976; 340/970; 340/973; 701/3; 701/18; 701/120
(58) Field of Search ................................ 340/973, 974, 340/975, 976, 970, 977, 980, 963, 961, 945; 244/180; 701/3, 4, 9, 14, 18, 120, 28

(56) References Cited

U.S. PATENT DOCUMENTS

| 5,445,021 A | * | 8/1995 | Cattoen et al. | ........... 73/178 R |
| 6,038,498 A | | 3/2000 | Briffe | |
| 6,085,129 A | | 7/2000 | Schardt | |
| 6,112,141 A | * | 8/2000 | Briffe et al. | ................... 701/14 |
| 6,154,151 A | * | 11/2000 | McElreath et al. | ......... 340/970 |
| 6,163,743 A | * | 12/2000 | Bomans et al. | ................ 701/3 |
| 6,505,102 B2 | * | 1/2003 | Morizet et al. | ................ 701/3 |

FOREIGN PATENT DOCUMENTS

EP              1087210 A      3/2001

* cited by examiner

Primary Examiner—Brent A. Swarthout

(57) ABSTRACT

Methods and apparatus are provided for generating a vertical situational image of a vehicle. The apparatus for generating a vertical situational image of the vehicle is comprised of an input device configured to receive flight plan data of the vehicle and a situational display configured to produce the vertical situational image from the flight plan data. The apparatus for generating a vertical situational image of the vehicle is further comprised of a processing device that is configured to receive the flight plan data from the input device, generate a first segment having a first slope in a first viewable range of the vertical situational image from the flight plan data and determine the first segment in a second viewable range of the vertical situational image. The processing device of the apparatus for generating a vertical situational image of the vehicle is further configured to modify the second viewable range to substantially maintain the first slope of the first segment if a viewable altitude of the vertical situational image is greater than an altitude threshold.

24 Claims, 3 Drawing Sheets

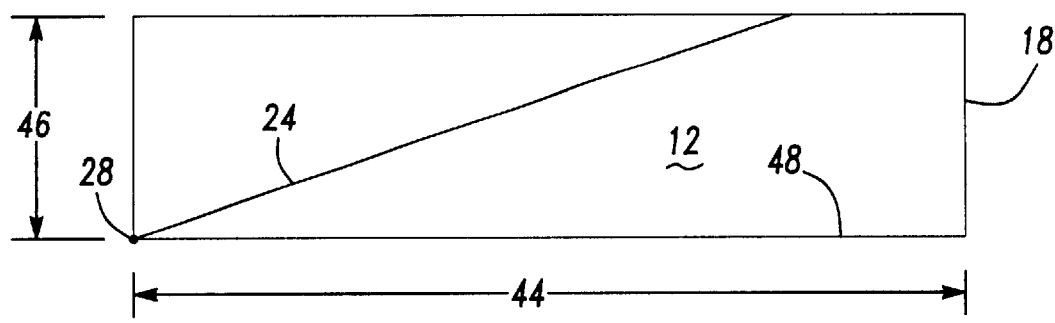
_Fig-2_
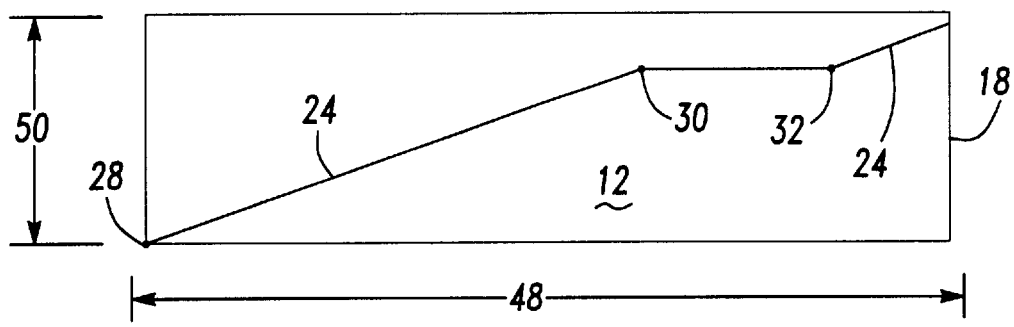
_Fig-3_
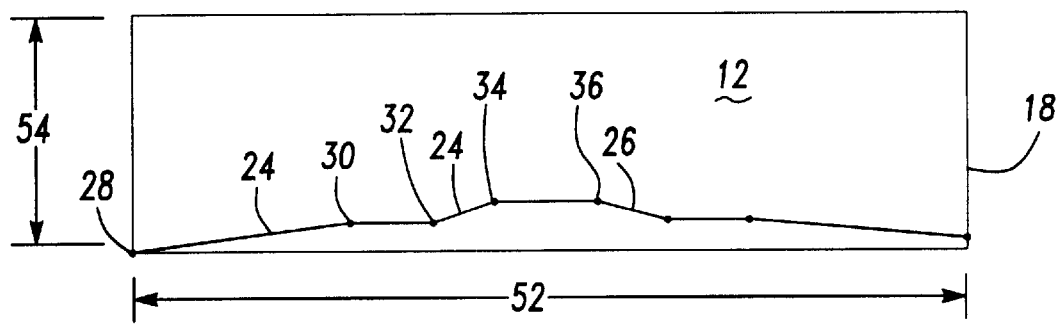
_Fig-4_

METHODS AND APPARATUS FOR GENERATING A VERTICAL SITUATIONAL IMAGE OF A VEHICLE

TECHNICAL FIELD

The present invention relates to a display of a vehicle, and more particularly to a method and apparatus for generating a vertical situational display of a vehicle.

BACKGROUND OF THE INVENTION

One of the many functions of a vertical situational display or VSD is to produce an image of a flight path from a current position of a vehicle to a destination. For example, the operator uses the flight path as a reference for lateral (i.e., range) guidance and vertical (i.e., altitude) guidance. The flight path is generally comprised of climb segments and descent segments typically defined by waypoints that begin at an origin threshold and end at a destination threshold. The climb, enroute and descent segments form a flight plan or FPL and the flight plan is visually displayed on the vertical situational display as a vertical situational image.

Generally, the image of a flight plan is produced on a vertical profile display located at a lower portion of a multi-function display or MFD. An input interface allows the operator to input a flight plan and develop the vertical profile. A processing device coupled to the input receives the input from the operator and generates the vertical profile of climb and descent segments. The climb, enroute and descent segments of the flight plan are typically generated using the linear equation of Y=MX, where Y is the altitude (i.e., vertical distance), X is the range and M is the slope, which is the ratio of the altitude to the range (i.e., M (the slope)=Y (altitude) /X (range).

Vertical situational displays use a number of techniques to generate the climb and descent segments of the flight plan in response to an operator input. For example, when a flight crewmember alters the range (X), the vertical situational display maintains a fixed altitude (Y). Therefore, as the flight crewmember alters the range (X) of the vertical profile, the climb angle or descent angle also changes and the slope of the climb segment and/or descent segment varies.

The suggestion has been made to use a constant slope (M) technique to improve a display that uses the varying slope technique. In contrast to a varying slope technique as briefly described in the preceding paragraph, the constant slope technique maintains a substantially constant or constant slope with an alteration of the range (X) through a modification of the altitude (Y). While the use of a constant slope technique significantly reduces the appearance on a display that the slope of the climb segment and/or descent segment varies with the alteration of the range (X), the use of a constant slope technique to display the climb segments and/or descent segments of a vertical situational image on a vertical situational display can cause a number of less than desirable visual display effects. For example, the flight plan can compress on the vertical situation display viewing area and reduce the visual reference and effectiveness for the operator of a vehicle.

In view of the foregoing, it should be appreciated that it would be desirable to provide methods and apparatus for generating a vertical situational display of a vehicle with a substantially constant or constant slope technique. In addition, it should be appreciated that it would be desirable to provide methods and apparatus for generating a vertical situational display of a vehicle with a substantially constant or constant slope technique with a reduction in undesirable display effects, such as compression of the vertical situational image on the vertical situational display. Furthermore, additional desirable features will become apparent to one skilled in the art from the foregoing background of the invention and following detailed description of a preferred exemplary embodiment and appended claims.

BRIEF SUMMARY OF THE INVENTION

An apparatus and method are provided for generating a vertical situational image of a vehicle. The apparatus for generating a vertical situational image of the vehicle is comprised of an input device configured to receive flight plan data of the vehicle and a situational display configured to produce the vertical situational image from the flight plan data. The apparatus for generating a vertical situational image of the vehicle is further comprised of a processing device that is configured to receive the flight plan data from the input device, generate a first segment having a first slope in a first viewable range for the vertical situational image from the flight plan data and determine the first segment in a second viewable range of the vertical situational image. The processing device of the apparatus for generating a vertical situational image of the vehicle is further configured to modify the second viewable range to substantially maintain the first slope of the first segment if a viewable altitude of the vertical situational image is greater than an altitude threshold.

BRIEF DESCRIPTION OF THE DRAWINGS

The present invention will hereinafter be described in conjunction with the appended drawing figures, wherein like numerals denote like elements, and:

FIG. 2 is the vertical situational display of FIG. 1 having a first viewable range of a flight plan according to a preferred exemplary embodiment of the present invention;

FIG. 3 is the vertical situational display of FIG. 1 having a second viewable range of the flight plan of FIG. 1;

FIG. 4 is the vertical situational display of FIG. 1 having a third viewable range of the flight plan of FIG. 1;

DETAILED DESCRIPTION OF PREFERRED EXEMPLARY EMBODIMENTS

The following detailed description of a preferred embodiment is merely exemplary in nature and is not intended to limit the invention or the application and uses of the invention.

Figure 1:
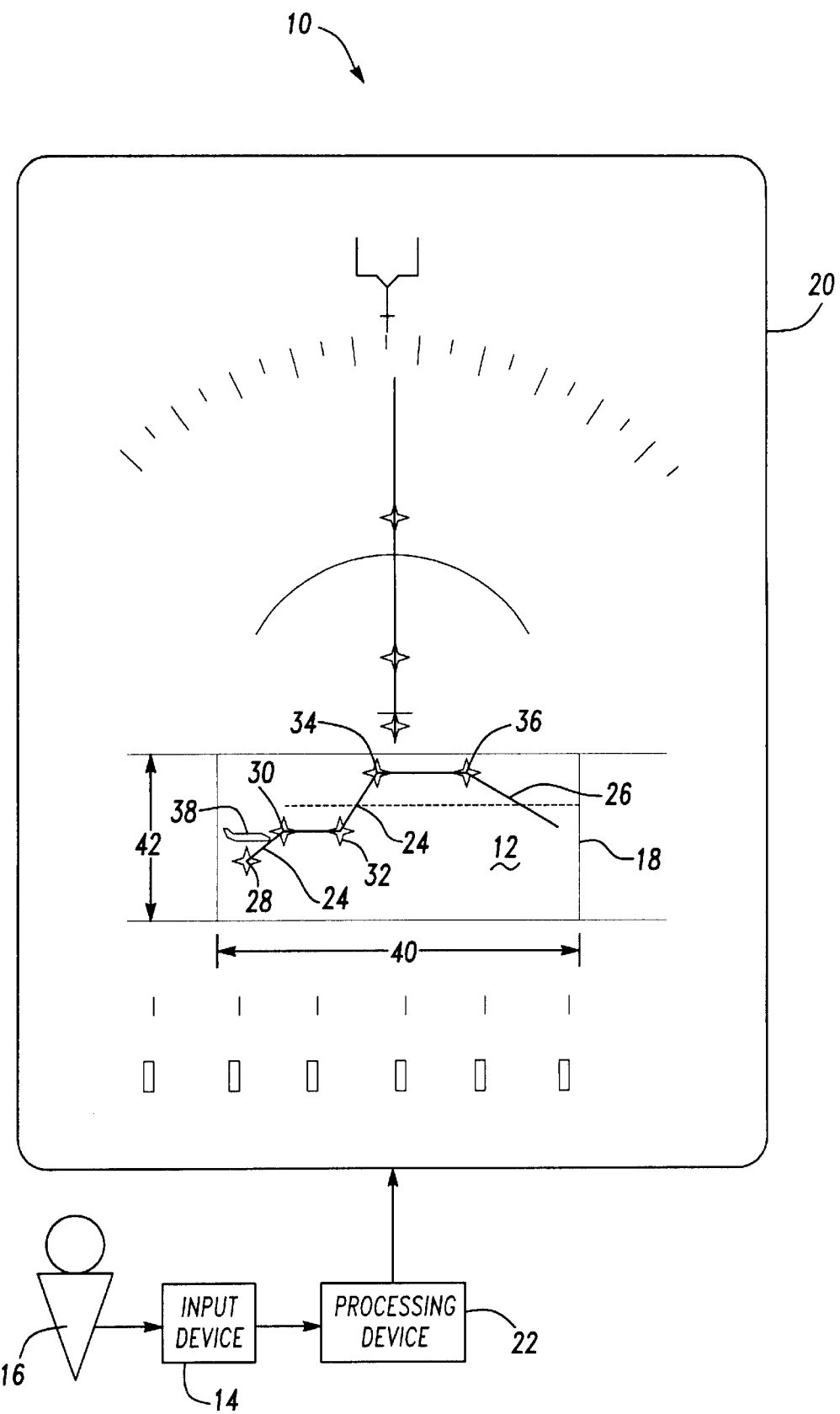
FIG. 1 is an apparatus for generating a vertical situational image of a vehicle according to a preferred exemplary embodiment of the present invention.

Referring to FIG. 1, an apparatus 10 for generating a vertical situational image 12 of vehicle (not shown) is illustrated according to a preferred exemplary embodiment of the present invention. The apparatus 10 is comprised of an input device 14 that is configured to receive flight plan data from an operator 16 and a vertical situational display 18, which is also referred to as a VSD, that is preferably located in a lower portion of a multi-function display 20 that is configured to produce the vertical situational image 12 from the flight plan data. However, the vertical situational display 18 can be located in any portion of the multi-functional display 20 or located within one or more other displays of the vehicle other than the multi-function display 20 and also located in a display of a structure other than the vehicle. While the following detailed description of preferred exemplary embodiments is described with reference to an aircraft, it should be understood that the present invention could be used for the display of any number of vehicles, including, but not limited to land vehicles, water vehicles and space vehicles.

The apparatus 10 for generating the vertical situational image 12 of the aircraft is also comprised of a processing device 22 that is configured to receive the flight plan data from the input device 14 and generate a segment and preferably multiple segments such as climb segments 24 and/or a descent segment 26 of a flight plan (FPL) having waypoints (28,30,32,34,36) and an aircraft location symbol 38. The segment (e.g., the climb segments 24 and/or descent segment 26) is generated in a viewable range 40 and a viewable altitude 42 with the segment having a slope (i.e., slope (M)=altitude (Y)/range (X)) in the viewable range 40 of the vertical situational image 12. The processing device 22 is also configured to determine the segment in a second viewable range of the vertical situational image 12 and modify the second viewable range to substantially maintain the slope of the segment if a second viewable altitude, which provides the substantially constant slope in the second viewable range is greater than an altitude viewable threshold.

More specifically, the segments (e.g., the climb segments 24 and/or descent segment 26) are provided between the waypoints (e.g., segments 28,30,32,34,36) as part of the flight plan. While five waypoints are illustrated in this example, it should be appreciated that any number of waypoints can be provided for the flight plan and also any number of climb segments and descent segments can be provided between any number of waypoints. In accordance with the present invention, the segment or segments provided between the waypoints are determined with a constant slope method or constant slope technique. The constant slope method is comprised of maintaining a substantially constant slope (M) or constant slope (M) when the operator of the aircraft adjusts the viewable range (X) on the vertical situational display (VSD). The substantially constant slope or constant slope is maintained when the operator of the aircraft adjusts the viewable range with a modification of the viewable altitude (Y). As can be appreciated by one of ordinary skill in the art and as discussed in the background of the invention, the relationship between the slope, range and altitude is a linear relationship as follows:

$$Y=MX \quad (1)$$

Where Y is the altitude (i.e., vertical distance of the vertical situational image), X is the range (i.e., horizontal distance of the vertical situational image) and M is the slope. Therefore, a substantially constant aspect ratio or constant aspect ratio between the altitude (Y) and range (X) (i.e., M=Y/X) is maintained to provide a substantially constant or constant slope (i.e., the altitude (Y) is adjusted to maintain the same value for the slope (M) as the range (X) is adjusted by the operator).

For example, and with reference to FIG. 2, the selection of a first viewable range 44 within the vertical situational display 18 produces a climb segment 24 with a first viewable altitude 46. If the first viewable range 44 is adjusted by the operator to a second range 48 as shown in FIG. 3, the viewable altitude is altered to a second viewable altitude 50 in order to maintain a substantially constant or constant value for the slope (M) of the segment (e.g., climb segment 26). Therefore, the vertical situational image 12 shown in FIG. 3 is produced with the second range 48, the second altitude 50 and a slope (M) that is substantially equal or equal to the slope (M) of the climb segment 26 with the first viewable range 44 and the first viewable altitude 46 as illustrated in FIG. 2. However, undesirable visual effects can result with the use of the constant slope technique, including compression of the vertical situational image.

Referring to FIG. 4, an example of a compression of the vertical situational image 12 is illustrated within the vertical situational display 18 when the operator of the display opts to view a third viewable range 52 that is greater than the first viewable range 44 of FIG. 2 and the second viewable range 48 of FIG. 3 and a constant slope technique is employed to generate a segment (e.g., climb segments 24 and descent segments (26). As can be seen in FIG. 4, the slopes (M) of the climb segments 24 and the descent segments 26 are substantially equal or equal to the slopes of the climb segments 24 and descent segments 26 of FIG. 3 and FIG. 4, and vertical situational image 12 of the flight plan is compressed within the third viewable range 52. In order to address this compression of the vertical situational image 12, the apparatus and method of the present invention is configured to determine the segment(s) within the third viewable range 52 of the vertical situational image 12 and modify the viewable range to substantially maintain the slope of the segment(s) if a viewable altitude of the vertical situational image 12 is greater than an viewable altitude threshold.

More specifically, the processing device 22 of FIG. 1 is configured to determine the third viewable altitude that provides the substantially constant or constant slope in the third viewable range using a constant slope method and also configured to compare the third viewable altitude that is determined using the constant slope method to the viewable altitude threshold. The viewable altitude threshold can be a predetermined value for a particular vertical situational display or a predetermined value that is selected based upon any number of criteria. Alternatively, the operator or other personnel can provide the predetermined value. If the third viewable altitude is greater than and/or about equal to the viewable altitude threshold, the viewable range is modified to substantially maintain the substantially constant or constant slope of the segment(s).

Figure 5:
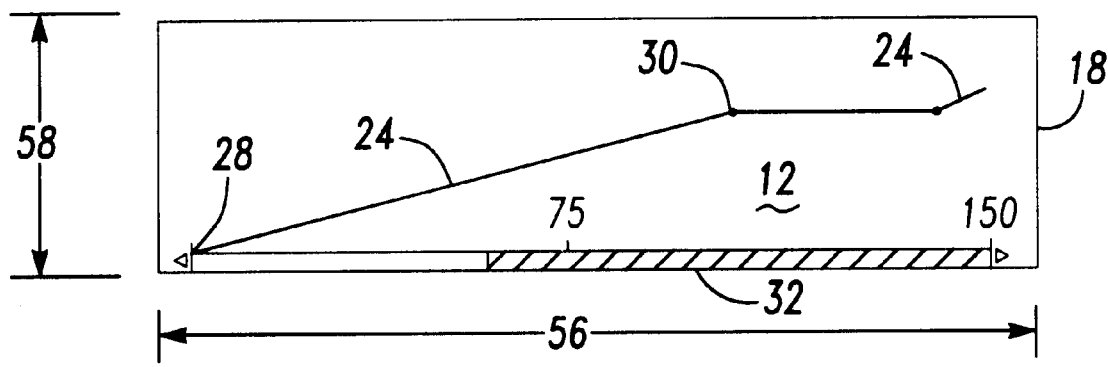
FIG. 5 is the vertical situational display of FIG. 4 having a first viewable subrange of the third viewable range of FIG. 4.

Referring to FIG. 5, the modification of the viewable range by the processing device 22 of FIG. 1 preferably involves producing the segment(s) in a viewable sub-range 56 of the originally selected viewable range (e.g., the third viewable range 52 of FIG. 4) with a viewable altitude 58 that is equal to or less than the viewable altitude threshold while maintaining the substantially constant or constant slope of the segment(s). For example, if the operator selects a viewable range of three hundred nautical miles and this three hundred nautical mile viewable range results in a viewable altitude that exceeds a viewable altitude threshold of ten thousand feet in order to substantially maintain or maintain a constant slope of the segment(s), the processing device 22 of FIG. 1 is configured to modify the three hundred nautical mile range to maintain the slope of the segments. The modification of the viewable range by the processing device 22 of FIG. 1 preferably involves producing the segment(s) in a viewable sub-range that is less than the viewable range (e.g., viewable sub-range of one hundred and fifty nautical miles) with a viewable altitude 58 that is equal to or less than the viewable altitude threshold (e.g., viewable altitude threshold of ten thousand feet). As can be appreciated by one of ordinary skill in the art, this provides a vertical situational image of a flight plan with segments having slopes that are maintained for different viewable ranges while significantly reducing compression of the vertical situational image.

In accordance with another preferred embodiment of the present invention and with reference to FIG. 1, the processing device 22 is configured to receive a sub-range selection input from the operator and produce other viewable subranges (e.g., a second viewable sub-range, third viewable sub-range, fourth viewable sub-range, etc.) of the viewable range as provided by the sub-range selection input. The sub-range selection input from the operator can be received by the input device 14 or can be received by an input device other than the input device 14 and can be any number of configurations such as a cursor control device (CCD) (e.g., joystick, trackball, mouse) or keyboard. This provides the ability for the operator to select other profile segments within originally selected range while providing slopes of the climb segments and descent segments that are substantially constant or constant.

Figure 6:
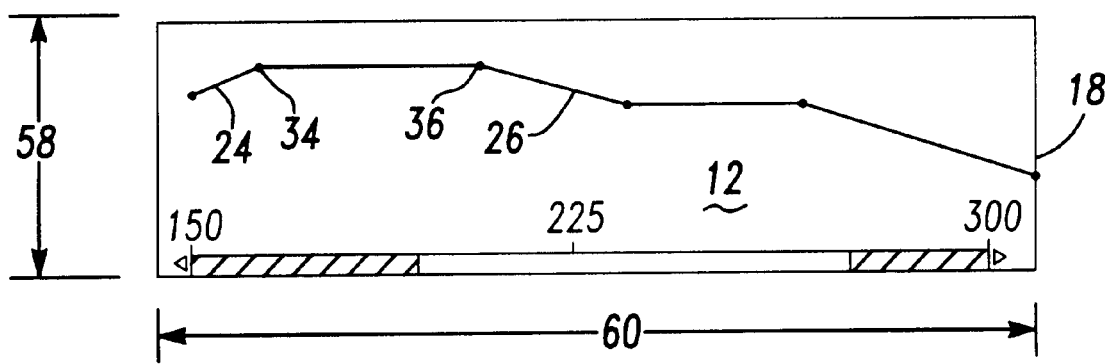
FIG. 6 is the vertical situational display of FIG. 4 having a second viewable subrange of the third viewable range of FIG. 4.

For example and with reference to FIG. 6, the vertical situational display 18 is shown with a second viewable sub-range 60 of the originally selected viewable range 52 of FIG. 4. The viewable altitude 58 is equal to or less than the viewable altitude threshold with the substantially constant or constant slope of the segment(s). Continuing with the example discussed with reference to FIG. 5, if the operator selects the viewable range of three hundred nautical miles and this three hundred nautical mile viewable range results in a viewable altitude that exceeds a viewable altitude threshold of ten thousand feet in order to substantially maintain or maintain a constant slope of the segment(s), the processing device 22 of FIG. 1 is configured to modify the three hundred nautical mile range to maintain the slope of the segments and provide the second viewable sub-range 60 of the three-hundred nautical mile range (e.g., one hundred and fifty nautical miles to three hundred nautical miles) such that the viewable range on the vertical situational display remains at one hundred and fifty nautical miles. As can be appreciate by one of ordinary skill in the art, any number of sub-ranges of the originally selected viewable range can be provided in accordance with the present invention. Therefore, the operator can view any portion of the vertical situational image within the vertical situational display while maintaining a substantially constant or constant slope of the segments. As an be appreciated by one of ordinary skill in the art, this reduces undesirable effects introduced with the constant slope technique, such as undesirable image compression. However, one of ordinary skill in the art can also appreciate other undesirable effects that are reduced with the apparatus and methods of the present invention and also appreciate other desirable effects introduced by the apparatus and methods of the present invention.

From the foregoing detailed description of preferred exemplary embodiments, it should be appreciated that apparatus and methods are provided for generating a vertical situational image of a vehicle. While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. An apparatus for generating a vertical situational image of a vehicle, comprising:
    an input device configured to receive flight plan data of the vehicle;
    a situational display configured to produce the vertical situational image from said flight plan data; and
    a processing device configured to:
        receive said flight plan data from said input device;
        generate a first segment in a first viewable range of the vertical situational image from said flight plan data; said first segment having a first slope in said first viewable range of the vertical situational image;
        determine said first segment in a second viewable range of the vertical situational image; and
        modify said second viewable range to substantially maintain said first slope of said first segment if a viewable altitude of the vertical situational image is greater than a viewable altitude threshold.

2. The apparatus for generating a vertical situational image of the vehicle of claim 1, wherein said processing device is configured to produce a first viewable sub-range of said second viewable range if said viewable altitude of the vertical situational image is greater than said altitude threshold.

3. The apparatus for generating the vertical situational image of the vehicle of claim 2, wherein said processing device is configured to produce a second viewable sub-range of said second viewable range if said viewable altitude of the vertical situational image is greater than said altitude threshold, said second viewable sub-range having a range that is substantially equal to said first viewable sub-range.

4. The apparatus for generating the vertical situational image of the vehicle of claim 3, wherein said processing device is configured to produce a third viewable sub-range of said second viewable range if said viewable altitude of the vertical situational image is greater than said altitude threshold, said third viewable sub-range having said range that is substantially equal to said first viewable sub-range and said second viewable range.

5. The apparatus for generating the vertical situational image of the vehicle of claim 1, wherein said processing device is configured to reduce said second viewable range until said viewable altitude is approximately equal to said altitude threshold.

6. The apparatus for generating the vertical situational image of the vehicle of claim 2, wherein said processing device is configured to reduce said second viewable range until said viewable altitude is less than to said altitude threshold.

7. The apparatus for generating the vertical situational image of the vehicle of claim 1, wherein said processing device is further configured to:
    generate a second segment in said first viewable range of the vertical situational image from said flight plan data; said second segment having a second slope in said first viewable range of the vertical situational image;
    determine said second segment in said second viewable range of the vertical situational image; and modify said second viewable range to substantially maintain said second slope of said second segment if said viewable altitude of the vertical situational image is greater than said altitude threshold.

8. The apparatus for generating the vertical situational image of the vehicle of claim 1, wherein said processing device is further configured to:

generate a plurality of segments in addition to said first segment in said first viewable range of the vertical situational image from said flight plan data; said plurality of segments having a plurality of slopes in said first viewable range of the vertical situational image;

determine said plurality of segments in said second viewable range of the vertical situational image; and modify said second viewable range to substantially maintain said plurality of slopes of said plurality of segments if said viewable altitude of the vertical situational image is greater than said altitude threshold.

9. The apparatus for generating the vertical situational image of the vehicle of claim 1, wherein said first segment is a climb segment.

10. The apparatus for generating the vertical situational image of the vehicle of claim 1, wherein said first segment is a descent segment.

11. The apparatus for generating the vertical situational image of the vehicle of claim 1, wherein said first segment is an enroute segment.

12. The apparatus for generating the vertical situational image of the vehicle of claim 1, wherein said vehicle is an aircraft.

13. A method for generating a vertical situational image of a vehicle, comprising:

receiving flight plan data;

generating a first segment in a first viewable range of the vertical situational image from said flight plan data; said first segment having a first slope in said first viewable range of the vertical situational image;

determining said first segment in a second viewable range of the vertical situational image; and modifying said second viewable range to substantially maintain said first slope of said first segment if a viewable altitude of the vertical situational image is greater than a viewable altitude threshold.

14. The method for generating the vertical situational image of the vehicle of claim 13, wherein said modifying said second viewable range to substantially maintain said first slope of said first segment if said viewable altitude of the vertical situational image is greater than said altitude threshold produces a first viewable sub-range of said second viewable range.

15. The method for generating the vertical situational image of the vehicle of claim 14, further comprising producing a second viewable sub-range of said second viewable range, said second viewable sub-range having a range that is substantially equal to said first viewable sub-range.

16. The method for generating the vertical situational image of the vehicle of claim 15, further comprising producing a third viewable sub-range of said second viewable range, said third viewable sub-range having said range that is substantially equal to said first viewable sub-range and said second viewable range.

17. The method for generating the vertical situational image of the vehicle of claim 13, wherein said modifying said second viewable range to substantially maintain said first slope of said first segment if said viewable altitude of the vertical situational image is greater than said altitude threshold is comprised of reducing said second viewable range until said viewable altitude is approximately equal to said altitude threshold.

18. The method for generating the vertical situational image of the vehicle of claim 13, wherein said modifying said second viewable range to substantially maintain said first slope of said first segment if said viewable altitude of the vertical situational image is greater than said altitude threshold is comprised of reducing said second viewable range until said viewable altitude is less than to said altitude threshold.

19. The method for generating the vertical situational image of the vehicle of claim 13, further comprising:

generating a second segment in said first viewable range of the vertical situational image from said flight plan data; said second segment having a second slope in said first viewable range of the vertical situational image;

determining said second segment in said second viewable range of the vertical situational image; and modifying said second viewable range to substantially maintain said second slope of said second segment if said viewable altitude of the vertical situational image is greater than said altitude threshold.

20. The method for generating the vertical situational image of the vehicle of claim 13, further comprising:

generating a plurality of segments in addition to said first segment in said first viewable range of the vertical situational image from said flight plan data; said plurality of segments having a plurality of slopes in said first viewable range of the vertical situational image;

determining said plurality of segments in said second viewable range of the vertical situational image; and modifying said second viewable range to substantially maintain said plurality of slopes of said plurality of segment if said viewable altitude of the vertical situational image is greater than said altitude threshold.

21. The method for generating the vertical situational image of the vehicle of claim 13, wherein said first segment is a climb segment.

22. The method for generating the vertical situational image of the vehicle of claim 13, wherein said first segment is a descent segment.

23. The method for generating the vertical situational image of the vehicle of claim 13, wherein said first segment is an enroute segment.

24. The method for generating the vertical situational image of the vehicle of claim 13, wherein said vehicle is an aircraft.

* * * * *